United States Patent Office 3,794,649
Patented Feb. 26, 1974

3,794,649
PROCESS FOR PREPARING NOBLE
METAL COMPLEXES
Philip D. Hammond, North Haven, William E. Litz, Jr., Branford, and Frederick E. Manemeit, North Haven, Conn., assignors to Olin Corporation, New Haven, Conn.
No Drawing. Filed Aug. 9, 1971, Ser. No. 170,286
Int. Cl. C07d 35/18
U.S. Cl. 260—270 R
9 Claims

ABSTRACT OF THE DISCLOSURE

Noble metal complexes are prepared by reacting, in a halogenated aromatic solvent medium, a powdered noble metal with a hydrohalide derivative of a heteroaromatic nitrogen compound. The resulting complexes are useful catalysts in the reaction of carbon monoxide with aromatic nitro compounds to form aromatic isocyanates.

---

This invention relates to a process for preparing halogenated complexes of noble metals and heteroaromatic nitrogen compounds.

Halogenated complexes of noble metals and heteroaromatic nitrogen compounds are known to be highly effective catalysts in the reaction of carbon monoxide with aromatic nitro compounds to form aromatic isocyanates. See for example U.S. Pat. 3,576,835, which issued Apr. 27, 1971 to Smith et al.

These complexes can be prepared, according to the prior art, by reacting a heteroaromatic nitrogen compound with an anhydrous noble metal halide, the latter being in turn prepared by a burdensome and costly process involving the reaction of a noble metal with a halogen at high temperatures, i.e., usually 500–600° C. Thus the relative high cost of preparing the noble metal halide intermediate renders this process of preparing the complexes economically undesirable.

Another prior art method of preparing the complexes is by reacting a heteroaromatic nitrogen compound with an aqueous solution of an alkali metal-noble metal derivative. But the use of aqueous solutions results in a moist complex so that additional steps must be taken to dry the complex such as by recrystallization from an anhydrous solvent.

Now it has been found, in accordance with this invention, that the halogenated complexes of noble metals and heteroaromatic nitrogen compounds can be easily prepared in a substantially pure, anhydrous form by reacting, in a halogenated aromatic solvent medium, a powdered noble metal with a hydrohalide derivative of a heteroaromatic nitrogen compound. Crystals of the complex are thus formed which can be easily separated from the reaction solution by any conventional solid-liquid separation technique.

Any of the noble metals may be employed in the process of the invention. These include palladium, rhodium, platinum, rhenium, iridium, ruthenium, osmium, silver, gold and mixtures thereof. It is preferred, however, to employ noble metals of the platinum series including palladium, rhodium, platinum, iridium, and mixtures thereof.

Any physical state of the noble metal may be employed in practicing the process of the invention. For example, palladium can be employed as palladium black as well as commercial palladium sponge.

The powdered noble metal, as used in the process of the invention, is comprised of particles all of which pass a 50 mesh screen and preferably all of which pass a 150 mesh screen. However, particles having a diameter larger than plus 50 may be employed if desired.

Any of the hydrohalide derivatives of heteroaromatic nitrogen compounds which compounds form complexes with noble metals may be employed. These derivatives may be prepared, for example by the additive reaction, at room temperature, of at least one molar proportion of a hydrohalic acid with one molar proportion of a heteroaromatic nitrogen compound. The hydrohalic acid can be aqueous or anhydrous gas, i.e., hydrogen halide gas. Illustrative hydrohalic acids include hydrochloric acid, hydrobromic acid, hydrofluoric acid, hydroiodic acid, or mixtures thereof. It is preferred, however, to employ hydrochloric acid, hydrobromic acid or mixtures thereof.

The heteroaromatic nitrogen compounds utilized in preparing the hydrohalide derivative are those containing between five or six members in the ring, containing only nitrogen and carbon in the ring, containing no more than two nitrogen atoms in the ring, and containig at least two double bonds in the ring. Suitable compounds of this type are disclosed in The Ring Index, by Patterson and Capell, 2nd ed., American Chemical Society, 1960, and supplements I, II and III. Derivatives of the heteroaromatic nitrogen compounds may also be utilized. The term "derivatives" when used in conjunction with heteroaromatic compounds throughout the description and claims is intended to include additions to the parent heteroaromatic nitrogen-containing ring of the following type.

(I) Substituents on the ring
    (a) halides such as chlorine, bromine, iodine and fluorine
    (b) alkyl containing between 1 and 40 carbon atoms
    (c) aryl such as phenyl, cresyl and xylyl
    (d) olefinic such as allyl, vinyl
    (e) hydroxy
    (f) mercapto
    (g) amino
    (h) alkylamino
    (i) cyano
    (j) oximino
    (k) aldehyde
    (l) ethers such as aryl, alkyl, and alkenyl ethers
    (m) thioethers such as aryl, alkyl, and alkenyl ethers
    (n) carboxy
    (o) carbalkoxy
    (p) carbamyl
    (q) carboaryloxy
    (r) thiocarbamyl
(II) Polycyclic analogues
    (a) fused benzene
    (b) fused cycloaliphatic
    (c) fused nitrogen-containing heteroaromatic
(III) Simple salts
(IV) Quaternary salts
(V) Oxides
(VI) Complexes with inorganic substances other than noble metal halides
(VII) Mixtures of two or more additions of types I–VI Listed below are typical heteroaromatic nitrogen compounds and derivatives thereof which are suitable for use in preparing the noble metal complexes.

(1) Five membered ring containing one nitrogen
   (a) 1-methyl pyrrole
   (b) 1-phenyl pyrrole
(2) Five membered ring containing two nitrogens
   (a) imidazole
   (d) 1-methyl imidazole
   (c) pyrazole
(3) Fused benzene and fused nitrogen-containing heteroaromatic derivatives of five membered rings containing one nitrogen
   (a) indole
   (b) indolenine (3-pseudoindole)
   (c) 2-isobenzazole
   (d) indolizine
   (e) 4aH-carbazole
   (f) carbazole
(4) Six membered ring containing one nitrogen and derivatives thereof
   (a) pyridine
   (b) 2,6-dimethylpyridine
   (c) 2,4,6-trimethylpyridine
   (d) 4-phenylpyridine
   (e) 2-vinylpyridine
   (f) 2-styrylpyridine
   (g) 2-bromopyridine
   (h) 2-chloropyridine
   (i) 3-chloropyridine
   (j) 2,6-dichloropyridine
   (k) 2-bromo-4-methylpyridine
   (l) 2-fluoropyridine
   (m) 2-allyloxypyridine
   (n) 4-phenylthiopyridine
   (o) 2-methoxypyridine
   (p) picolinic acid
   (q) nicotine acid
   (r) 2,6-dicyanopyridine
   (s) pyridine-2-aldehyde (picolinaldehyde)
   (t) 2-aminopyridine
   (u) 4-dimethylaminopyridine
   (v) diphenyl-4-pyridylmethane
   (w) 4-hydroxypyridine
   (x) 2-mercaptopyridine
   (y) 2-oximinopyridine
   (z) 4-tertiarybutylpyridine
(5) Fused benezene and fused nitrogen-containing-heteroaromatic derivatives of six membered ring containing one nitrogen
   (a) quinoline
   (b) 2-chloroquinoline
   (c) 8-hydroxyquinoline
   (d) isoquinoline
   (e) acridine
   (f) phenanthridine
   (g) 7,8-benzoquinoline
   (h) 4H-quinolizine
   (i) naphythyridine
   (j) carboline
   (k) phenanthroline
   (l) benzo [h] isoquinoline
   (m) benzo [g] quinoline
   (n) benzo [g] isoquinoline
   (o) benzo [h] quinoline
   (p) benzo [f] quinoline
   (q) benzo [f] isoquinoline
   (r) 1H-benzo [de] quinoline
   (s) 4H-benzo [de] quinoline
   (t) 4H-benzo [de] isoquinoline
   (u) 1H-benzo [de] isoquinoline
   (v) purine
   (w) adenine
   (x) pteridine
   (y) 7H-pyrazino [2,3-c] carbazole
   (z) pyrazino [2,3-d] pyridazine
   (aa) 4H-pyrido [2,3-c] carbazole
   (bb) pyrido [1'2':1,2] imidazo [4,5-b] quinoxaline
   (cc) 6H-perimidine
   (dd) perimidine
(6) Six membered ring containing two nitrogens and derivatives thereof
   (a) pyrazine
   (b) 4,6-dimethylpyrimidine
   (c) 2,6-dimethylpyrazine
   (d) pyridazine
(7) Fused benzene and fused nitrogen-containing heteroaromatic derivatives of six membered rings containing two nitrogens
   (a) quinoxaline
   (b) 2,3-dimethylquinoxaline
   (c) phthalazine
   (d) quinazoline
   (e) phenazine
   (f) cinnoline
(8) Simple salts of heteroaromatic nitrogen compounds or derivatives thereof in section 1–7 above
   (a) Simple salts include nitrates, hydrohalides, sulfates and acetates of these compounds such as the following:
      (1) pyridine hydrochloride
      (2) 2-chloropyridine-1-oxide hydrochloride
      (3) 4-chloropyridine hydrochloride
      (4) 4,4'-bipyridyl dihydrochloride
(9) Quaternary salts of heteroaromatic nitrogen compounds or derivatives thereof of sections 2 and 4–7 above
   (a) Alkyl halides, where alkyl contains 1–40 carbon atoms, acyl halides, and nitroaryl halides, such as:
      (1) 1-methylquinolinium chloride
      (2) laurylpyridinium chloride
      (3) 1-(4-pyridyl) pyridinium chloride hydrochloride
(10) Oxides of heteroaromatic bases and derivatives thereof of sections 2 and 4–7 above
   (a) Oxides include oxides of quinoline, pyridine, isoquinoline and imadazole, and are illustrated by the following oxides:
      (1) pyridine-1-oxide
      (2) 4-bromopyridine-1-oxide
      (3) 2-hydroxypyridine-1-oxide
      (4) picolinic acid-1-oxide
      (5) 4-mehoxy pyridine-1-oxide
      (6) 2-bromo-6-methylpyridine-1-oxide
      (7) 2-picoline-1-oxide
      (8) 4-picoline-1-oxide
(11) Complexes of heteroaromatic nitrogen compounds with inorganic substances (other than noble metal halides of sections 2 and 4–7 above)
   (a) Complexes include pyridine, quinoline and isoquinoline complexes illustrated by the following pyridine complexes:
      (1) (pyridine)$_3 \cdot$ FeCl$_3$
      (2) pyridine $\cdot$ SO$_3$
      (3) pyridine $\cdot$ CrO$_3$
      (4) pyridine $\cdot$ VCl$_3$
      (5) pyridine $\cdot$ V$_2$O$_5$
      (6) pyridine $\cdot$ MoO$_3$.

All of the foregoing heteroaromatic nitrogen compounds and derivatives thereof may be utilized in preparing the noble metal complexes. However, it is preferred to employ pyridine, isoquinoline, or quinoline.

As indicated above, the reaction between the powdered noble metal and the hydrohalide derivative of a heteroaromatic nitrogen compound is carried out in the presence of a halogenated aromatic solvent. Any such solvent which has a boiling point not exceeding about 300° C. and contains one or more nuclear-substituted halogens (e.g., chlorine, bormine, fluorine, iodine or mixtures thereof) may be employed. Usually these solvents contain up to 12, and preferably up to 10, carbon atoms. Illustrative solvents include the dichlorobenzenes (ortho-, para-, or meta-), the dibromobenzenes, the difluorobenzenes, the diiodobenzenes, the dichlorotoluenes, the dibromotoluenes, the difluorotoluenes, the diiodotoluenes, the trichlorobenzenes, the tribromobenzenes, the trichlorotoluenes, the tribromotoluenes, the mono-, di-, and polyhalogenated xylenes, the mono-, di-, and polyhalogenated ethyl benzenes, the mono-, di-, and polyhalogenated ethyl benzenes, the mono-, di-, and polyhalogenated diethyl benzenes, the mono-, di-, and polyhalogenated propyl benzenes, the mono-, di-, and polyhalogenated triethyl benzenes and so forth. It is preferred, however, to employ those halogenated aromatic solvents in which the halogen is chlorine, bromine or a mixture thereof. It is also preferred to employ those halogenated aromatic solvents in which the halogen substitution is limited to the benzene ring.

In carrying out the complex-forming reaction, the relative proportions of noble metal to hydrohalide derivative depends on the particular metal, the particular hydrohalide, i.e., the particular heteroaromatic nitrogen compound and the number of moles of hydrohalic acid used to prepare the hydrohalide derivative, and the particular complex end product desired. To illustrate, in making bis-(pyridine) palladium dichloride complex, $Pd(pyridine)_2Cl_2$, two moles of pyridine monohydrochloride are employed per palladium atom; in making tris(isoquinoline)rhenium trichloride complex, three moles of isoquinoline monohydrochloride are employed per rhenium atom; and to prepare bis(isoquinoline) palladium tetrachloride complex, two moles of isoquinoline dihydrochloride are employed per palladium atom. Thus any molar proportion of the hydrohalide derivative, per atom of noble metal, which results in the formation of a halogenated nobel metal complex may be employed. Usually, however, at least one molar proportion of the hydrohalide derivative is employed per atom of noble metal.

The reaction between the powdered noble metal and the hydrohalide derivative of a heteroaromatic nitrogen compound is carried out under conditions of continuous agitation and at a temperature which is above about 100° C. but below the boiling temperature of the halogenated aromatic solvent, i.e., below about 300° C. The preferred reaction temperature range is about 140°–260° C. No particular conditions as to pressure are required. Thus conveniently the reaction can be conducted at atmospheric pressure.

In carrying out the reaction, the halogenated aromatic solvent may be placed in a reaction vessel equipped with means for agitating its contents such as a magnetic stirrer or a mechanical paddle agitator. The powdered metal is then added, followed by the hydrohalide derivative of a heteroaromatic nitrogen compound. Heat is applied to bring and maintain the temperature of the reaction mixture within the above-specified range. Agitation is continued until the reaction is complete. If desired at this point, the hot reaction mixture is filtered before cooling in order to remove any suspended foreign matter there without removing any of the product complex which is still in solution. The reaction mixture is then cooled to room temperature causing the product complex to crystallize out. The complex crystals are removed by filtration and dried to remove any solvent residue therein.

The dried complex product will be substantially pure and can be used directly in catalyzing the isocyanate-forming reaction of carbon monoxide with an aromatic nitro compound.

The process of the invention may be employed to prepare any halogenated complexes of noble metal and heteroaromatic nitrogen compounds. Illustrative of these complexes are those represented generally by the formula $$M(R)_m(X)_n$$

wherein

M is a noble metal,
R is a heteroaromatic nitrogen compound,
X is a halogen,
$m$ is an integer of 1–4 and preferably 2–3,
$n$ is an integer of 1–4 and preferably 2–4, and
the sum total of $m$ plus $n$ is an integer of 4–6

Specific illustrations of complexes which are prepared in substantially pure and anhydrous foam according to the process of the invention are the following:

$Rh(pyridine)_2Cl_3$
$Pd(pyridine)_2Cl_2$
$Rh(isoquinoline)_3Cl_3$
$Pd(isoquinoline)_2Cl_2$
$Ir(pyridine)_3Cl_3$
$Ir(isoquinoline)_3Cl_3$
$Pd(isoquinoline)_2Cl_4$
$(Isoquinoline)_2H_2PdCl_4$
$Pd(pyridine)_2Cl_4$
$Pd(pyridine)_2Br_4$
$Pd(isoquinoline)_2Br_2$
$Pd(pyridine)_2Br_2$
$Pd(isoquinoline)I_2$.

The process of the invention provides a relatively simple and inexpensive method for preparing halogenated noble metal complexes in anhydrous, substantially pure form. It avoids the necessity of using anhydrous noble metal halide intermediates, which are costly to prepare, in making the complexes. It also does away with the use of an aqueous medium in preparing the complexes thereby eliminating burdensome drying steps which would otherwise be necessary in order to obtain an anhydrous complex product.

As indicated above, the noble metal complex product of the process of the invention is a useful catalyst in the reaction of carbon monoxide with an aromatic nitrogen compound to form an aromatic isocyanate. Details of this isocyanate-forming reaction are disclosed in U.S. Pat. 3,576,835 which issued to Smith et al. on Apr. 27, 1971, the entire disclosure of which is incorporated by reference herein. This catalytic reaction is carried out at elevated temperatures and pressure, for example at a temperature of about 100–250° C. and a pressure of about 100–20,000 p.s.i.g. In accordance with one embodiment of the invention, the noble metal complex catalyst can be produced in situ in the isocyanate-forming reaction medium. This is accomplished by adding the powdered noble metal, the hydrohalide derivative and the halogenated aromatic solvent to the isocyanate-forming reaction mixture. The noble metal complex catalyst is then formed in situ for catalyzing the isocyanate-forming reaction. This embodiment of the invention is particularly desirable from an economic standpoint inasmuch as it eliminates the preparatory steps and apparatus used to make the noble metal complex before this can be utilized as a catalyst.

In still another embodiment of the invention, the method described herein is employed in regenerating the noble metal catalyst used in the isocyanate-forming reaction referred to above. It is known that in the course of this reaction, at least a portion of the noble metal catalyst is rendered caalytically inactive or less active. This is believed to be due to the reaction of the carbon monoxide with the noble metal catalyst, reducing the noble metal to a catalytically inactive, elemental state. In accordance with this embodiment of the invention, the inactive catalyst can be regenerated or reactivated by reacting the inactive noble metal with a hydrohalide derivative of a heteroaromatic nitrogen compound in the presence of a halogenated aromatic solvent as described above. This catalyst-regenerating reaction can be carried out after separating the inactive catalyst from the isocyanate-forming reaction medium or, as is more preferred, in situ. For example, at some point in time after the commencement of the isocyanate-forming reaction, the used catalyst is separated from the reaction medium, such as by filtration. The wet catalyst filter cake can then be reacted with a hydrohalide derivative of a heteroaromatic nitrogen compound in a halogenated aromatic solvent according to the process of the invention. Optionally, before carrying out this reaction, the wet filter cake may be extracted with a halogenated aromatic solvent to recover any unused catalyst present therein, dried, roasted to remove any organic materials therein, and reduced with hydrogen to the elemental noble metal or an oxide thereof.

To illustrate the in situ catalyst regeneration in accordance with this embodiment of the invention, at any point in time after the commencement of the isocyanate-forming reaction, a hydrohalide derivative of a heteroaromatic nitrogen compound and a halogenated aromatic solvent are added to the reaction mixture. Any suitable proportion of the hydrohalide derivative may be employed, although this proportion usually need not exceed that which is required stoichiometrically to react with all of the noble metal in the catalyst. In situ conversion of the catalytically inactive noble metal to the catalytically active complex is thus effected, the resulting complex immediately acting to catalyze further reaction between the carbon monoxide and the aromatic nitrogen compound.

The following examples are provided to illustrate the invention. In these examples, all parts and percentages given are by weight unless otherwise specified.

EXAMPLE 1

To 100 grams of ortho-dichlorobenzene and 1 gram of pyridine hydrochloride, there was added 0.5 gram of palladium black. The mixture was placed in a 250 ml. glass flask, equipped with a magnetic stirrer and a reflux condenser, and heated with stirring to 160° C. for one hour. The palladium black dissolved with the formation of a yellowish brown color. After the one hour reaction time, the mixture was filtered while still hot, and the filtrate was allowed to cool to room temperature resulting in the formation of well-defined yellow crystals. These crystals were separated by filtration and dried. They were then identified by infrared analysis as trans bis-pyridine palladium chloride, Pd(pyridine)$_2$Cl$_2$.

EXAMPLE 2

The identical procedure of Example 1 was followed except that instead of the pyridine hydrochloride, isoquinoline hydrochloride was used. The resulting crystalline product was identified by infrared analysis as being bis - isoquinoline palladium dichloride, Pd(isoquinoline)$_2$Cl$_2$.

EXAMPLE 3

Into a stainless steel autoclave there were charged 3 grams of 2,4-dinitrotoluene, 0.3 gram of palladium black, 0.6 gram of pyridine hydrochloride, and 9 grams of ortho-dichlorobenzene. The autoclave was sealed and pressurized with carbon monoxide to about 2,500 p.s.i.g. While being rocked at 36 cycles per minute, the autoclave was heated to 200° C. and maintained at this temperature for 90 minutes. Thereafter, it was cooled to room temperature. After venting, the reaction mixture was discharged and weighed, and the autoclave was rinsed with two 5 ml. portions of ortho-dichlorobenzene which portions were added to the reaction mixture. The mixture was then filtered to remove isoluble matter (solids formed during the reaction and unused catalyst). The filtered solids were washed with ortho-dichlorobenzene, the wash solutions being added to the filtrate. The combined filtrate was finally subjected to vapor phase chromatography to determine its content of 2,4-toluene diisocyanate which was found to be 33%. Thus this example illustrates the utility of the invention in enabling the preparation, and immediate effective use, of the noble metal catalyst complex in situ in the isocyanate-forming reaction.

COMPARATIVE TESTS 1–2

To illustrate the catalytic inactivity of palladium black, when used in the absence of a hydrohalide derivative of a heteroaromatic nitrogen compound, the procedure of Example 3 followed in each of these with one modification. No pyridine hydrochloride was employed in Comparative Test 1 and in Comparative Test 2, instead of the pyridine hydrochloride, pyridine was used. In both tests the content of 2,4-toluene diisocyanate in the final, combined filtrate was found to be 0.

EXAMPLE 4

This example is provided to illustrate the utility of the invention in regenerating catalytically inactive or less active palladium which has been used up in the catalytic reaction of carbon monoxide with an aromatic nitro compound.

Into a stainless steel autoclave there were placed 150 grams of 2,4-dinitrotoluene, 120 grams of bis-isoquinoline palladium dichloride complex, 15 grams of molybdenum oxide, and 1215 grams of ortho-dichlorobenzene. The autoclave was then sealed, pressurized with carbon monoxide to 3000 p.s.i.g. and heated to 200° C. for about two hours. After cooling to room temperature and venting, the contents of the autoclave were discharged, filtered, and the resulting solids were extracted with hot ortho-dichlorobenzene to obtain a used catalyst residue containing metallic palladium. This residue was combusted in an air stream for about two hours to burn off unidentified, solid reaction by-products.

The identical procedure of Example 3 was now repeated using, instead of the 0.3 gram palladium black, 0.3 gram of the combusted residue. The content of 2,4-toluene diisocyanate in the combined filtrate product was determined by vapor phase chromatography to be 31%.

What is claimed is:

1. The process of preparing a noble metal complex having the formula:

$$M(R)_m(X)_n$$

wherein

M is a noble metal selected from the group consisting of palladium, rhodium, platinum and iridium, R is a heteroaromatic nitrogen compound selected from the group consisting of pyridine, isoquinoline and quinoline, X is a halogen, $m$ is an integer of 1–4, $n$ is an integer of 1–4, and the sum total of $m$ plus $n$ is an integer of 4–6, said process comprising the steps of reacting together (1) a powdered noble metal selected from the group consisting of palladium, rhodium, platinum and iridium, and (2) a hydrohalide salt of a heteroaromatic nitrogen compound selected from the group consisting of pyridine, isoquinoline and quinoline, (3) in the presence of an aromatic solvent having a boiling point not exceeding 300° C. and having at least one nuclear-substituted halogen, (4) said reaction being carried out at a temperature above about 100° °C. but below the boiling point of said solvent.

2. The process of claim 1 wherein said noble metal is comprised of particles all of which pass through a 50-mesh screen.

3. The process of claim 2 wherein the halogen in said hydrohalide salt is selected from the group consisting of chlorine, bromine, and mixtures thereof.

4. The process of claim 3 wherein said aromatic solvent contains up to 12 carbon atoms.

5. The process of claim 4 in which the halogen in said aromatic solvent is selected from the group consisting of chlorine, bromine, and mixtures thereof.

6. The process of claim 5 wherein at least one molar proportion of said hydrohalide salt is employed per atom of said noble metal.

7. The process of claim 6 wherein said reaction is carried out at a temperature of about 140–260° C.

8. The process of claim 7 wherein said noble metal is palladium and is comprised of particles all of which pass through a 150-mesh screen.

9. The process of claim 8 wherein said aromatic solvent is ortho-dichlorobenzene.

References Cited

UNITED STATES PATENTS

| | | | |
|---|---|---|---|
| 3,318,891 | 8/1960 | Hausman | 260—270 R |
| 3,450,730 | 6/1969 | Scheben et al. | 260—270 R |
| 3,480,632 | 11/1969 | Scheben et al. | 260—270 R |
| 3,576,835 | 4/1971 | Smith | 260—270 R |
| 3,654,279 | 4/1972 | Hurley et al. | 260—270 R |

DONALD G. DAUS, Primary Examiner

U.S. Cl. X.R.

260—240.9, 242, 286 Q, 298, 313.1, 315, 453 P